(12) United States Patent
Hagen

(10) Patent No.: US 6,397,455 B1
(45) Date of Patent: Jun. 4, 2002

(54) METHOD FOR FORMING A ONE-PIECE FLEXURE FOR SMALL MAGNETIC HEADS

(75) Inventor: Tracy Michael Hagen, Edina, MN (US)

(73) Assignee: Seagate Technology, Inc., Scotts Valley, CA (US)

( * ) Notice: Subject to any disclaimer, the term of this patent is extended or adjusted under 35 U.S.C. 154(b) by 0 days.

(21) Appl. No.: 09/675,145

(22) Filed: Sep. 29, 2000

Related U.S. Application Data

(63) Continuation of application No. 07/975,352, filed on Nov. 12, 1992.

(51) Int. Cl.⁷ .................................................. G11B 5/42
(52) U.S. Cl. ............................... 29/603.03; 29/603.04; 216/14
(58) Field of Search ........................ 29/603.03, 603.04, 29/603.05, 603.06; 216/13, 14

(56) References Cited

U.S. PATENT DOCUMENTS

| | | |
|---|---|---|
| 5,428,490 A | 6/1995 | Hagen |
| 5,434,731 A | 7/1995 | Hagen |
| 5,504,640 A | 4/1996 | Hagen |
| 5,638,234 A | 6/1997 | Hagen |
| 5,923,500 A | 7/1999 | Hagen |

*Primary Examiner*—Carl E. Hall
(74) *Attorney, Agent, or Firm*—Oblon, Spivak, McClelland, Maier & Neustadt, P.C.

(57) ABSTRACT

A gimbal formed integral with a load beam by through etching a H pattern at the end of the beam to define a pair of tabs connected by a pair of beams; half etching from the head direction one tab with an defined area masked to form a load button; and half etching the beam from the other direction to provide the proper gimbal stiffness. In practice, the head is glued to the other tab and load is applied through the button.

19 Claims, 6 Drawing Sheets

METHOD FOR FORMING A ONE-PIECE FLEXURE FOR SMALL MAGNETIC HEADS

The application is a continuation and claims priority under 35 USC 120 to application Ser. No. 07/975,352, filed Nov. 12, 1992, and hereby incorporates by reference the entirety of the disclosure of application Ser. No. 07/975,352.

BACKGROUND OF THE INVENTION

1. Field of the Invention

This invention relates generally to the field of rigid disc drive data storage devices and more particularly to a one-piece flexure assembly for supporting the read/write heads of the disc drive.

2. Brief Description of the Prior Art

Disc drives of the type known as "Winchester" disc drives are well known in the industry. Such disc drive data storage devices typically contain a stack of rigid discs coated with a magnetic medium on which digital information is stored in a plurality of circular concentric tracks. The storage and retrieval of data—also called "writing" and "reading", respectively—is accomplished by an array of heads, usually one per disc surface, which are mounted on an actuator mechanism for movement from track to track. The most common form of actuator used in the current generation of disc drive products is the rotary voice coil actuator, which uses a voice coil motor (VCM) coupled via a pivot mechanism to the heads to access data on the disc surfaces. The structure which supports the heads for this movement is referred to as a head/gimbal assembly, or HGA.

The HGA in a typical disc drive consists of three components:

1. a slider, which features a self-acting hydrodynamic air bearing and an electromagnetic transducer for recording and retrieving information on a spinning magnetic disc. Electric signals are sent to and received from the transducer via very small twisted copper wires;
2. a gimbal, which is attached to the slider and is compliant in the slider's pitch and roll axes for the slider to follow the topography of the disc, and is rigid in the yaw and in-plane axes for maintaining precise slider positioning, and;
3. a load beam, which is attached to the gimbal and to a mounting arm which attaches the entire assembly to the actuator. The load beam is compliant in the vertical axis to, again, allow the slider to follow the topography of the disc, and is rigid in the in-plane axes for precise slider positioning. The load beam also supplies a downward force that counteracts the hydrodynamic lifting force developed by the slider's air bearing.

Since the introduction of the first Winchester disc drive, the physical size of the slider has been progressively reduced, first from the original Winchester head to the so-called "mini-Winchester", and more recently to the 70 and 50 Series heads, which are 70% and 50% the size, respectively, of the mini-Winchester slider. While these size reductions are significant, the overall vertical dimension of the HGA has been dictated more by the slider-supporting mechanism than by the size of the slider itself.

The load beam and gimbal comprise an assembly generally known as a head suspension, head flexure, or simply a flexure. An example of such a flexure is described in U. S. Pat. 4,167,765.

Historically, the gimbal and load beam are fabricated discretely. The gimbal and load beam pieces are realized by chemically etching 300 series stainless steel foil into the desired shape, and then the two pieces are attached by means of laser welding.

The general technology trend in disc drive data storage devices is continual shrinking of the physical size of the product while providing increased data storage capacity. The down-sizing of the product has required smaller components, especially the principal components such as discs, sliders and flexures. Additionally, disc drive designers seek to add capacity to their designs by incorporating as many discs as possible within defined package dimensions. As the number of discs in the unit increases, the spacing between the discs decreases, thus further driving the need for smaller sliders and flexures.

Another industry trend is to provide the user of disc drives with high data storage capacity at low cost. This requires developing improved data recording technology and finding lower cost ways of manufacturing the components of the disc drive.

The use of discrete gimbal and load beam components laser welded together, as shown in the '765 patent, has become problematic in disc drives of the current 2.5", 1.8" and 1.3" generations of disc drives. In such units, the flexures must become thinner in order to allow desirable close spacing of the discs, while the overlapping required to laser weld two discrete components necessitates increased thickness in the flexure.

Furthermore, the use of thinner gimbal and load beam components increases the likelihood of residual stress caused by the laser welding of the two components together. It has been found that laser welding produces residual tensile stress in the material local to the welds. This causes the flexure to distort. In the longitudinal direction, the flexure curls from the residual weld stress, and this makes it more difficult to fit the flexure between closely spaced discs during the manufacturing process. Further, if the welds are not placed symmetrically about the centerline of the flexure, the residual weld stress will cause a torsional distortion, or twisting, of the flexure. Such an flexure is undesirable since the twist will create a moment, or torque, on the slider's air bearing, causing unwanted changes in the flying attitude of the head, and potentially rendering the assembly unusable.

The welding process is also a substantial portion of the labor that goes into the manufacture of a flexure, and it would, thus, be advantageous to eliminate the practice of making discrete gimbals and load beams and welding the two together for cost reduction.

Since the gimbal and load beam components must overlap in flexures of existing art, the emphasis on reducing the thickness of the flexure assembly has most often focused on reducing the thickness of the individual gimbal and load beam components. The thickest area of the load beam is the region known as the rigid beam, which usually features flanges along the outer edge along the longitudinal axis of the flexure. U.S. Pat. No. 4,996,616 teaches how a pair of drawn ribs can provide reinforcement of the rigid beam section of the flexure. Unfortunately, the drawn pair of ribs of '616 requires that the flexure material be strained to exceedingly high levels. Such stain can introduce cracks in the drawn material, and high stresses in the material near the ribs.

Various attempts have been made to solve the problems inherent in welding a gimbal and load beam together by devising a flexure in which the gimbal and load beam are formed from a single piece of material and would thus require no welding. An example of such an integrated gimbal and load beam is presented in U.S. Pat. No. 4,245, 267. A second example is known as the HTI Type 16, or T16, manufactured by Hutchinson Technology, Incorporated. Both of these flexures have a gimbal incorporated into the load beam and, of course, no gimbal-to-load beam welds. Both include a bonding surface on which adhesive is placed to secure attachment of the slider to the flexure. A plurality of beams, etched into the load beam, connects this bonding surface to the load beam portion of the flexure and provides the desired gimbal characteristics.

One failing of the flexure of the '267 patent and the T16 flexure relates to an element of flexure design commonly referred to as "load point". Simply stated, load point refers to the single point of contact where the downward force of the load beam is applied to the slider. Proper selection of this load point ensures that the forces related to the hydrodynamic air bearing of the slider are properly balanced. In prior art flexures such as the one described in the '765 patent, load point is developed by forming an upward-extending dimple in the gimbal bonding surface. The load beam contacts the spherical surface of this dimple at a single point to allow proper gimbal action. In the case of the '267 and T16 flexures, however, a well defined load point is not provided, and, thus, an undesirably wide range of variation in slider flying characteristics is associated with these types of flexure.

A second fundamental problem with the '267 and T16 types of flexures is that the downward force of the load beam is applied to the slider by placing the gimbal beams into bending mode, and the gimbal beams must therefore be stiff in bending mode. These same gimbal beams, however, must be compliant in bending mode to allow the proper gimballing action. This conflicting requirement results in designs that either work poorly as a gimbal or become deformed under load.

A third problem with the '267 and T16 flexures is that the slider bonding surface, in general, covers a large area over the center of the slider. The slider is attached to the flexure with an adhesive epoxy, and, in order to reduce the cure time of the adhesive, the assembly is usually heated in an oven. Since the slider and flexure are made of dissimilar materials with different coefficients of linear thermal expansion, thermally induced strains develop at the bond when the assembly cools. These strains can distort the slider and undesirably change the flatness of the air bearing surface of the slider, thus, once again, introducing unacceptably wide variation into the flying characteristics of the heads.

A need clearly exists for an improved slider-supporting flexure which reduces the overall vertical height of the HGA, and which can be manufactured in a simple, cost-effective manner.

SUMMARY OF THE INVENTION

The flexure of the present invention is a one-piece load beam/gimbal assembly formed from a single piece of material. Features for providing the gimballing action, bonding of the slider to the flexure and location of the load point are all created using the processes of etching and half-etching. In the preferred embodiment, the gimbal end of the flexure is substantially rectangular, and a generally H-shaped opening is symmetrically located within the rectangular shape. The side rails formed between the H-shaped opening and the side edges of the gimbal are half-etched to reduce their thickness, and these side rails act as the gimballing mechanism of the flexure. A pair of tabs is formed in the gimbal end of the flexure on either side of the cross-member of the H-shaped opening, and one of these tabs is also half-etched to reduce its thickness. The full-thickness tab is used to bond the slider to the flexure, go while the other tab serves to locate a load point contact which is formed by not half-etching in the desired location for the load point. The load beam portion of the flexure is stiffened by forming side rails or channels along the sides of the load beam portion of the flexure and by forming a tear-drop-shaped indentation in the load beam. Both the side rails and indentation are formed toward the side of the flexure on which the slider is mounted.

It is an object of the invention to provide a low-height flexure for mounting and supporting a slider.

It is another object of the invention to provide a flexure wherein the gimbal and load beam elements are formed from a single piece of material, and require no welding.

It is another object of the invention to provide a flexure which is simple and inexpensive to manufacture.

It is another object of the invention to provide a flexure which incorporates a load point which is well defined and simple to locate at an optimized location.

BRIEF DESCRIPTION OF THE DRAWINGS

The features, benefits and objects of the invention can be best understood from the following detailed description of the invention when read in conjunction with the following drawings.

DETAILED DESCRIPTION OF THE INVENTION

Figure 1:
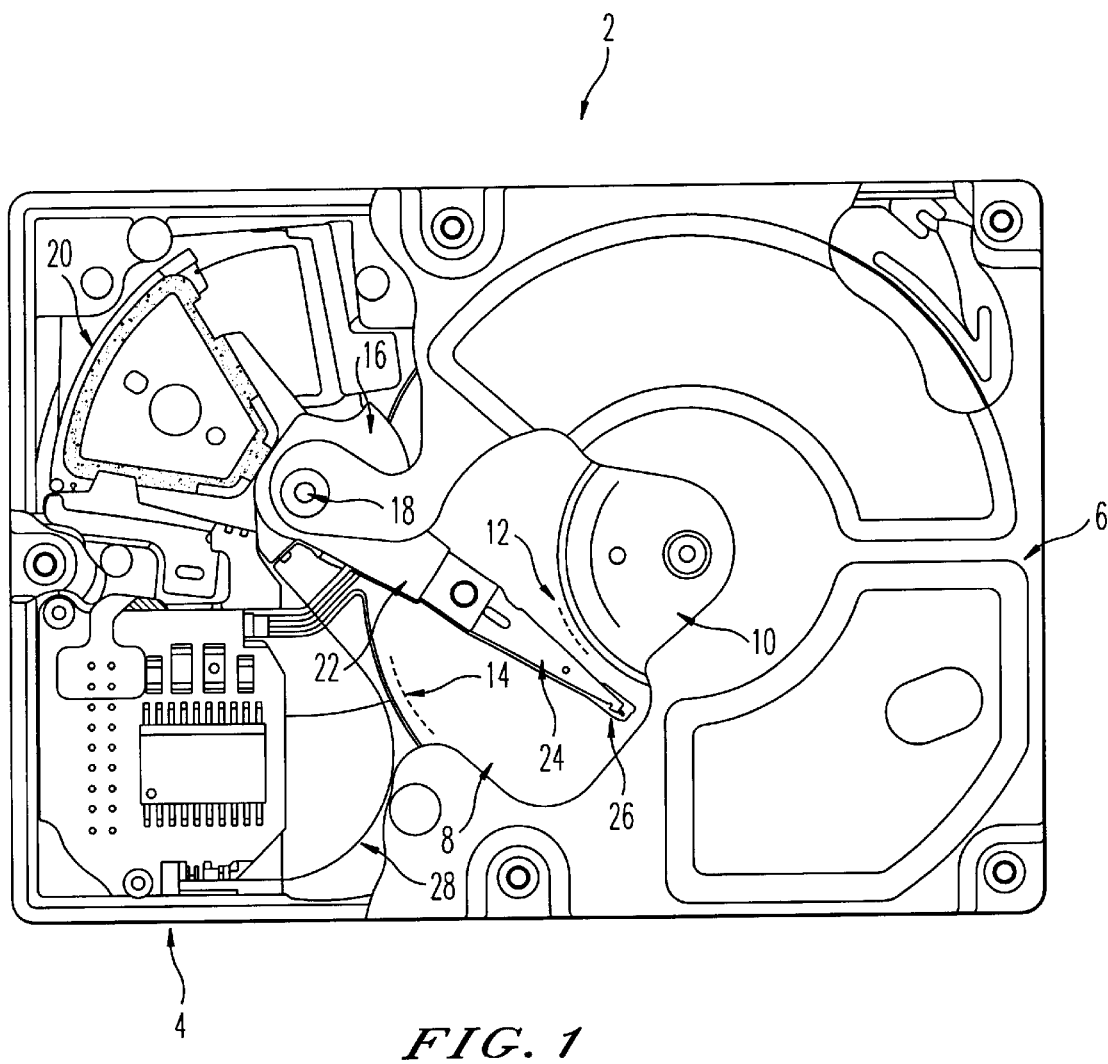
FIG. 1 is a plan view of a disc drive data storage device in which the present invention is particularly useful.

Referring now to the drawings and more specifically to FIG. 1, shown is a disc drive 2 in which the present invention is particularly useful. The disc drive 2 includes a base member 4 which, in cooperation with a top cover 6 (shown in partial cutaway), forms a sealed environment to protect the delicate internal components from outside contaminants. A number of rigid discs 8 coated with a magnetic medium are mounted for rotation on a spindle motor (shown generally at 10). The surfaces of the discs 8 hold a large number of concentric circular tracks to which information is written and from which information is read. These tracks are represented by the innermost and outermost tracks, designated by broken lines 12 and 14 respectively.

An actuator body 16 is adapted for rotation about a pivot shaft 18 by a voice coil motor (VCM), shown generally at 20. On the side of the actuator body 16 opposite the VCM 20 are a number of head mounting arms 22 to which are attached a plurality of flexures 24 for the mounting of sliders 26. Power for the VCM 20, as well as the signals used to read and write data, is passed via a printed circuit cable (PCC) 28.

Figure 2:
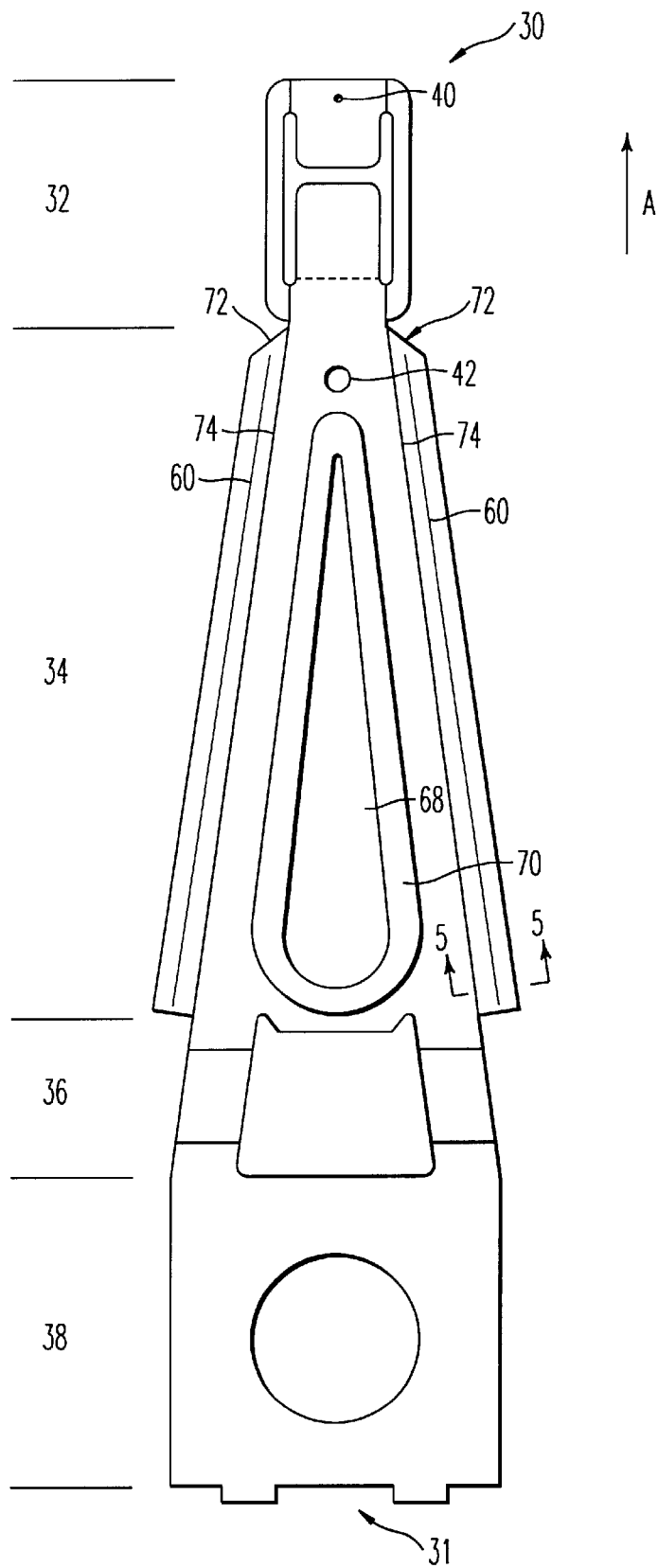
FIG. 2 is a plan view of the preferred embodiment of the flexure of the present invention.

Turning now to FIG. 2, shown is a plan view of a flexure 30 made in accordance with the present invention. The flexure 30 is symmetrical about a longitudinal axis 31 and is made up of four distinct major areas:

1. a gimbal/slider mounting area 32;
2. a rigid beam 34;
3. a pair of compliant beams 36, and;
4. an attachment surface 38.

The entire flexure 30 is formed from a single piece of 300 series full hard stainless steel, preferably 0.0025 inches in thickness, and manufactured using well known chemical etching processes.

A pair of alignment holes 40, 42 aid in fixturing the flexure during the process of bonding the slider (not shown).

The attachment surface 38 in the example of FIG. 2 is shaped to be attached to a particular type of mounting plate to provide a strong surface for attachment of the entire flexure head assembly to the head mounting arms 22 of the actuator body 16. While the specific method of mounting the flexure is not considered a part of this invention, it should be noted that this attachment surface 38 could easily be adapted for use with other types and designs of mounting apparatus.

The direction of movement of the disc relative to the flexure is shown by arrow A. Any slider attached to the flexure of the present invention is therefore assumed to have its leading edge closest to the attachment surface 38 and its trailing edge closest to the free end of the gimbal/slider mounting area 32.

The gimbal/slider mounting area 32, the rigid beam 34 and the pair of compliant beams 36 will each be discussed in turn below.

Figure 3:
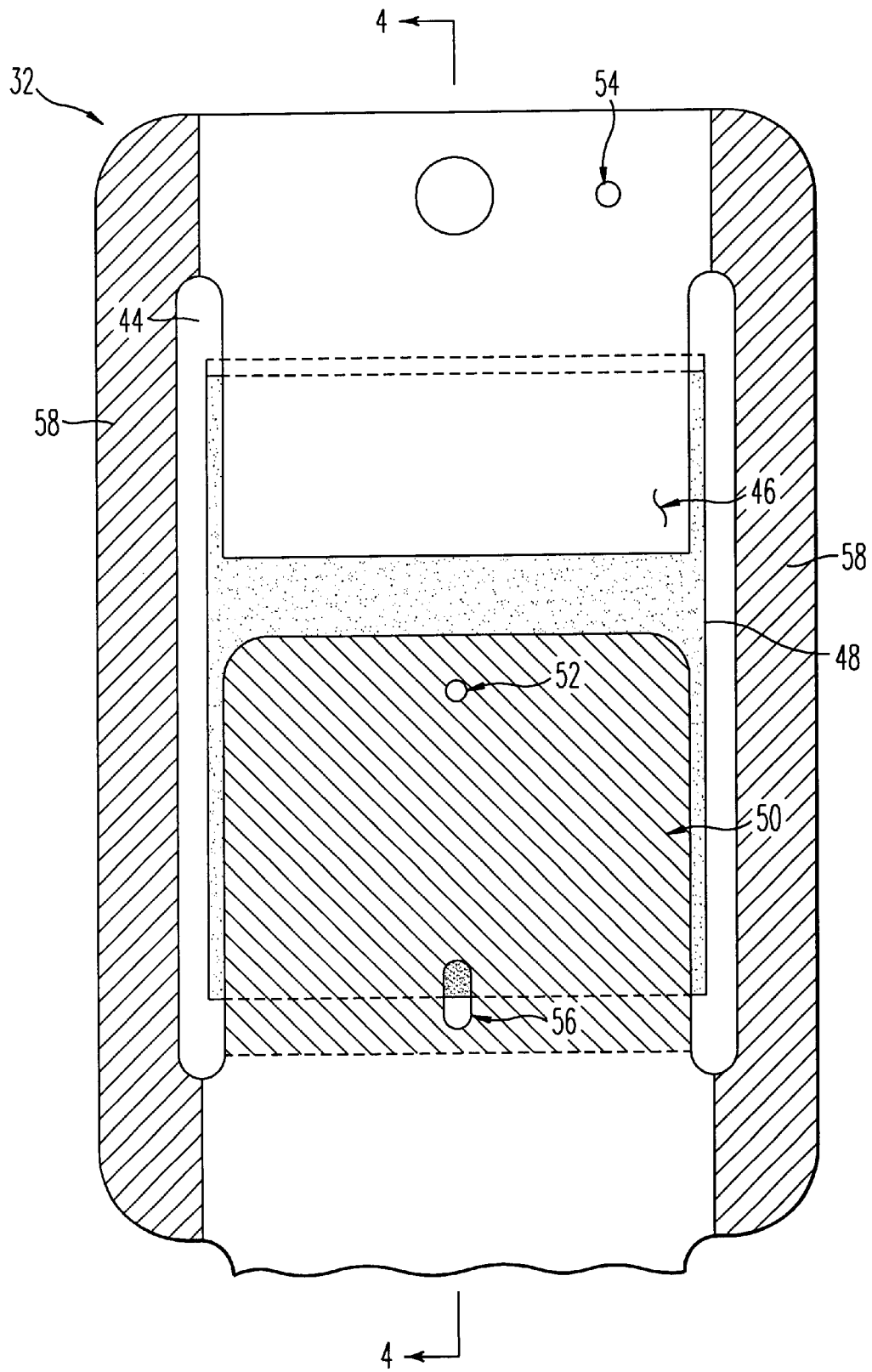
FIG. 3 is a detailed view of the gimbal portion of the flexure of FIG. 2.

FIG. 3 shows a detailed view of the gimbal/slider mounting area 32 of the flexure of the present invention with a slider 48 attached. As was previously mentioned, the flexure of the present invention is formed by the process of chemical etching. In usual chemical etching processes, the material to be etched is first coated on both sides with a material called resist. The resist is patterned using a stencil and exposing the resist to a light source. Unexposed resist is then stripped away, leaving exposed metal that will be etched away in the presence of an acid-like etchant. Both sides of the material are treated in this manner, with the pattern on both sides being very accurately aligned. This is the process used to define the perimeter outline of the flexure of the present invention and all through openings.

In half-etching, the pattern of the stencil on one side of the material is dissimilar to that on the other side. This also is a well known technique for etching text, art or half-tone photographs into sheet metal. It is known that if the area to be half-etched is large—that is, it has a length or diameter many times that of the material thickness—the depth of the half-etching will be approximately sixty percent that of the material thickness.

The process of full- and half-etching is used to produce several of the features of the flexure of the present invention. For instance, as can be seen in FIG. 3, an H-shaped opening 44 has been etched completely through the material, and areas beside the vertical legs and on one side of the cross member of the H-shaped opening 44 have been half-etched. Specifically, the area shaded lower-left-to-upper-right is half etched on the near side of the material, while the area shaded lower-right-to-upper-left has been half-etched on the far side of the material. Since the overall thickness of the material is approximately 0.0025 inches, these half-etched areas are reduced in thickness to about 0.0010 inches thick.

This half-etching process forms a pair of gimbal beams 58 which will be discussed in detail below.

The etching process also forms a slider mounting tab 46 to which the slider 48 is adhesively bonded. As can be seen in the figure, this bonding is thus done only in that area of the slider 48 closest to the trailing edge of the slider 48. In prior art flexures, such as the flexure of the '765 patent, the bonding surface was generally centered on the slider and occupied a large percentage of the entire top surface of the slider. The location of the bonding surface in the flexure of the present invention has several advantages:

1. In prior art flexures, the air bearing surface distortion created by thermal strain during oven curing of the adhesive was significantly large, since the bonding was done in the center of the slider and over a relatively large area of the slider. In general, the smaller the bonding surface and the farther the bonding surface is removed from the center of the slider, the lower the amount of air bearing distortion caused by oven curing of the adhesive. With the flexure of the present invention, the bonding surface is located as far as possible from the center of the slider—in fact, with a 50% slider, the bonding surface includes only that area within approximately 0.025 inches of the trailing edge of the slider—thereby providing minimal air bearing surface distortion.

2. The flexure of the present invention provides great ease of inspection of the adhesive bond between the slider and the flexure. In prior art flexures, the bonding surface is located between the slider and a separate load beam. The load beam obstructs the view of the bonding surface, which makes it difficult, if not impossible, to confirm the presence of adhesive fillets around the entire perimeter of the bonding surface. In the flexure of the present invention, no such visual obstruction exists.

3. The structure of the flexure of the present invention facilitates conductive heating of the bonding surface to speed the curing of the adhesive. In prior art flexures, the adhesive that secures the slider to the flexure was typically heated in a convective oven to hasten adhesive curing. Conductive heating, also known as "hot foot bonding" can substantially reduce the curing time, but was generally not practical in prior art flexures since the load beam prevented direct access to the bonding surface. In the flexure of the present invention, the bonding surface is completely accessible for conductive heating, thus potentially reducing the time required to cure the adhesive securing the slider to the flexure.

4. The flexure of the present invention also provides for greater bond strength than could be realized in prior art flexures. For a variety of reasons, the bonding surface of prior art flexures could not extend over the full width of the slider. Since, in general, the wider the bond, the greater the bond strength, and since the inventive flexure allows the bond to extend across virtually the entire slider, the flexure of the present invention can be expected to provide the maximum bond strength for a given size of slider.

The H-shaped opening 44 also forms a load point tab 50 on the opposite side of the cross-member of the opening from the slider mounting tab 46. The load point tab 50 transmits the load force of the flexure to the slider 48 via a load point button 52, or load supporting protrusion, which is formed by masking the desired location and size prior to half-etching, so that the load point button 52 maintains the full thickness of the flexure material. Since the load point tab 50 is half-etched on the far side of the material as viewed, this has the effect of creating a "pin" which projects toward and contacts the top of the slider 48. The load point button 52 should be as small in area as is possible given the manufacturer's capability in chemical etching. This dimension has been found currently to be about 0.002 inches, which causes the load force of the flexure to be applied to the slider at as close as possible to a single point. The location of this single point is selected to provide the desired flying characteristics for the particular design.

Several significant advantages are realized by the flexure of the present invention over flexures of the prior art:

1. The load point button 52 of the flexure of the present invention can be more exactly located relative to the slider than can the load points of prior art flexures. In prior art flexures, the load point is typically a spherical formed projection, or dimple, in the approximate center of the slider bonding area which contacts the load beam at a single point at the apex of the projection. However, the exact apex of the spherical projection, and therefore the exact load point, is difficult to determine. The exact location of the half-etched load point button 52 of the flexure of the present invention is, by comparison, easy to determine.

2. With the load point button 52 of the flexure of the present invention there is less variability in protrusion height. In formed protrusions of the prior art, the tolerance on the protrusion height has typically been ±0.0010 inches. In the flexure of the present invention, this variability has been reduced to the order of ±0.0002 inches.

3. There is less variation in the location of the load point with the flexure of the present invention than in prior art flexures. In prior art flexures, the spherical protrusion is generally formed as a secondary step in the manufacturing process after the shape and size of the flexure have been determined by etching. This means that the location where the forming occurs varies with respect to the datum edges of the flexure, since some clearance must be provided between the datum edges of the flexure and the location surfaces of the forming die. In the flexure of the present invention, the edge datums and load point button coexist on the same artwork pattern, or mask, thus substantially reducing the variability in the location of this feature.

4. The flexure of the present invention provides greater flexibility to modify the desired location of the load point than do prior art flexures. The location of the load point relative to the slider is critical to obtain the desired flying attitude of the slider. Occasionally during the development of a new disc drive product, or the modification of an existing product, it may become necessary to change the location of the load point. It has been economically impractical to modify the location of the formed spherical projection of prior art flexures due to the required retooling and new fixtures. Therefore, modifications in load point location in prior art flexures have generally been accomplished by modifying the bonding fixtures used to align the slider and flexure during the adhesive bonding procedure. With the flexure of the present invention, it is possible to change the location of the load point button 52 by simply changing the artwork pattern, or mask, used in the etching process. Generally speaking, master artwork patterns are far less expensive to modify than fixtures and hard tooling.

The actual shape of the load point button 52 can be easily determined by the artwork pattern, and can thus be round, oval or oblong should such be desired. In some cases it may be desirable or necessary to radius the edges of the load point button 52. This can be done by spanking the button with a suitably shaped die. An alternative method would be etching a half-tone transition between the top of the button and the full depth of the half-etching. The half-tone pattern could consist of small circles whose size and spacing are related to their distance from the center of the button, or rings whose line width and line spacing are also related to their distances from the button center.

The exact location of the load point button 52 is determined to provide the desired flying attitude of the slider. Typically, this location is a few thousandths of an inch away from the center of the slider toward the trailing edge. The desired load point is also frequently offset from the longitudinal centerline of the slider to compensate for velocity vector field variations and such known factors as the torsional bias applied by the tiny wires used to carry read/write signals to and from the head. If such an offset in load point location is incorporated in the artwork pattern, it can be extremely difficult to determine the direction of this offset visually. Such a determination is necessary because flexures intended for use on opposite sides of the discs would typically have this offset in opposite directions. Therefore, the artwork pattern can include an offset determination hole 54 which would be located at an obviously assymmetrical location and would indicate toward which side of the flexure the load point button 52 was offset.

Another feature of the flexure of the present invention is a slider alignment inspection hole 56. This slider alignment inspection hole 56 may be round or elongated as shown in the figure. Such a feature is desirable when measuring the alignment of the slider to the flexure with a vision based metrology system. Such measuring systems depend on high contrast at edge locations, and a through hole will allow a portion of the slider edge to be silhouetted by a profile light source when the slider is properly aligned with the flexure.

FIG. 3 also shows a pair of gimbal beams 58 formed adjacent the vertical legs of the H-shaped opening 44. It should be recalled that these gimbal beams 58 were half-etched on the near side of the material as viewed in FIG. 3 to a thickness of approximately 0.0010 inches. Since the slider 48 is bonded to the slider mounting tab 46, and load force is applied to the slider 48 through the load point button 52 on the load point tab 50, it will be apparent to one skilled in the art that the gimbal beams 58 will allow the necessary gimballing action of the flexure while still maintaining needed stiffness in the desired axes. To ensure proper operation of the gimbal beams 58, it is desirable to have the plane of the gimbal beams 58 coincident with the point of contact of the load point button 52 with the slider 48. This is best achieved in the flexure of the present invention when the half-etching of the gimbal beams 58 and the load point tab 50 are on opposite sides of the material. In some instances, it may be desirable to introduce some forming of the load point tab 50, since this tab is subject to some deflection when under load. The amount of deflection of the load point tab 50 can be found using the following formula:

$$\text{deflection} = \frac{4FL^3}{EWT^3} \quad (1)$$

where:

F is the load force

L is the distance from the load point button to the root of the load point tab;

E is the modulus of elasticity of the flexure material;

W is the width of the load point tab at its root, and;

T is the thickness of the load point tab.

The slope at the end of the load point tab can be found using the formula:

$$\text{slope} = \frac{6FL^2}{EWT^3} \quad (2)$$

Using algebra, it is possible to show that the end of a deflected beam can be made tangent to the root of the beam if the beam is formed at a point one-third the length of the beam from the base of the beam.

The preferable method of forming the single bend in the load point tab 50 is by stamping. In volume manufacturing, it may be necessary, due to variation in material thickness and half-etch depths, to overbend and then relax back to the desired angle using, for instance, infrared heating.

An example of the calculations to determine the design of the load point tab follows.

Assume:

Load point is offset 0.005" from center of slider toward the trailing edge.

Half length of the slider is 0.040".

Clearance (end of slider to end of tab) is 0.005".

Tab base width is 0.058.

Tab length (L)(base to load point) is $$0.005" + 0.040" + 0.005" = 0.050"$$

Load force (F) is 3 grams.

Deflection under load at the load point can be found using the following formula:

$$\frac{FL^3}{3EI} \quad (3)$$

where I is the bending moment of inertia.

Solving the equation with the above assumptions:

Slope under load at the load point can be found using the $$\frac{3 \cdot (2.204622/1000) \cdot (.050^3)}{3 \cdot (27.6) \cdot 10^6 \cdot \frac{1}{12} \cdot (.058) \cdot (.001^3)} = .002066 \text{ inches}$$

following formula:

$$\frac{FL^2}{2EI} \quad (4)$$

Solving equation (4) with the above assumptions:

$$\frac{3 \cdot (2.204622/1000) \cdot (.050^3)}{3 \cdot (27.6) \cdot 10^6 \cdot \frac{1}{12} \cdot (.058) \cdot (.001^3)} = .061974 = 3.546°$$

Therefore, if the load point tab 50 is preformed with a 3.546° bend at a point one-third of the distance from the base of the tab to the load point button 52, it can be assumed that the actual contact point between the load point button 52 and the slider 48 will lie substantially in the plane of the gimbal beams 58 when the assembly is under designed load conditions.

Figure 4:
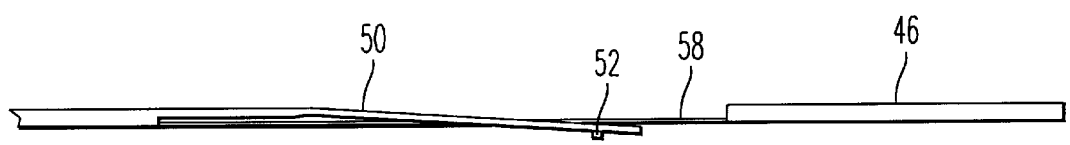
FIG. 4 is a sectional view of the gimbal portion of the flexure of the present invention.
Figure 4A:
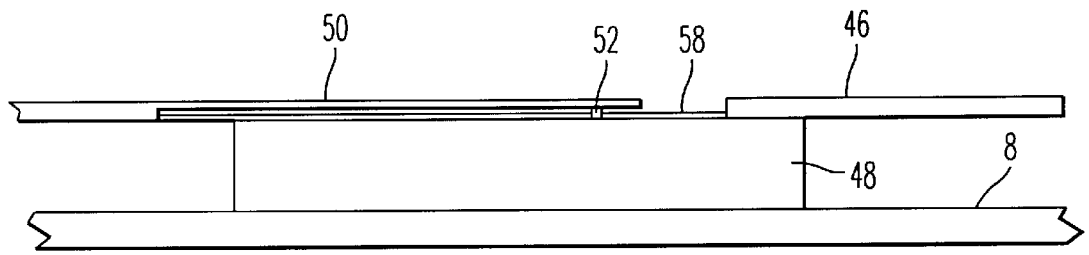
FIG. 4A is a sectional view of the gimbal portion of the flexure of the present invention as assembled to a slider and in cooperative arrangement with a disc.

Referring now to FIG. 4, the desired forming of the load point tab 50 is illustrated by a detail sectional view taken along line 4—4 of FIG. 3. As can be seen, the load point tab 50 is bent in the direction of the slider (not shown) at an angle of approximately 3.546°. Because of this bending, when the slider is mounted on the slider mounting tab 46, and the entire assembly is brought into its intended relationship with the spinning disc of the disc drive, the bottom of the load point button 52—and thus the top surface of the slider—will lie substantially in the plane occupied by the gimbal beams 58. This relationship is best seen in FIG. 4A, wherein a slider 48 has been bonded to the slider mounting tab 46 and the entire assembly brought into operational relationship to a disc 8.

Similarly, various characteristics of gimbal beam stiffness can also be calculated.

Assume:

L (length of the gimbal beams)=0.106".

r (distance from the load point button contact to the gimbal beam trailing edge)=0.053".

w (width of one gimbal beam)=0.010".

t (thickness of the gimbal beam)=0.001".

The stiffness of the gimbal can be calculated in various axes using the following formulae:

$$\text{Pitch stiffness} = \frac{2EIr}{L}\left(\frac{6r}{L^2} + \frac{2}{r} - \frac{6}{L}\right) =$$

$$\frac{2 \cdot (27.6) \cdot 10^6 \cdot \frac{1}{12} \cdot 2 \cdot (.010) \cdot (.001^3) \cdot (.053)}{.106}\left(\frac{6 \cdot .053}{.106^2} + \frac{2}{.053} - \frac{6}{.106}\right) =$$

$$.00434 \frac{\text{inch} - \text{lb}}{\text{rad}} = .197 \frac{\text{inch} - \text{gram}}{\text{rad}}$$

$$\text{Roll stiffness} = \frac{Ewt^3}{3(1+v)L}$$

where $v$ is Poisson's ratio =

$$\frac{27.6 \cdot 10^3 \cdot .010 \cdot .001^3}{3(1+.305) \cdot .106} = .001330 \frac{\text{inch} - \text{lb}}{\text{rad}} = .603 \frac{\text{inch} - \text{lb}}{\text{rad}}$$

$$\text{Yaw stiffness} = \frac{2EIr}{L}\left(\frac{6r}{L^2} + \frac{2}{r} - \frac{6}{L}\right) =$$

$$\frac{2 \cdot 27.6 \cdot 10^6 \cdot \frac{1}{12} \cdot (.090^3 - .070^3) \cdot .001 \cdot .053}{.106}\left(\frac{6 \cdot .053}{.106^2} + \frac{2}{.053} - \frac{6}{.106}\right) =$$

$$8.375 \frac{\text{inch} - \text{lb}}{\text{rad}}$$

$$\text{Across track stiffness} = \frac{24EI}{L^2(2L-3r)} =$$

$$\frac{24 \cdot 27.6 \cdot 10^6 \cdot \frac{1}{12} \cdot .001 \cdot .010^3}{.106^2(2 \cdot .106 - 3 \cdot .053)} = 92.694 \frac{\text{lb}}{\text{inch}}$$

$$\text{Along track stiffness} = \frac{E2wt}{L} = \frac{27.6 \cdot 10^6 \cdot 2 \cdot .010 \cdot .001}{.106} = 5208 \frac{\text{lb}}{\text{inch}}$$

$$\text{Striction stress} = \frac{1}{2wt} = \frac{2.204622/100}{2 \cdot .010 \cdot .001} = 110.231 \frac{\text{psi}}{\text{gram}}$$

An analysis of these stiffness figures reveals that the gimbal is relatively compliant in the pitch and roll axes, as is desireable for following minor variations in the surface of the disc, while it is very stiff in the yaw axis, since any compliance in yaw would result in misalignment of the head from the desired on track position. Similarly, the across-track stiffness and along track stiffness are very high to maintain on-track stability.

It should be noted that the stiction stress calculation is normalized to one gram of stiction force, and since the yield stress limits of the materials envisioned is on the order of 200,000 psi, only an amount of stiction which would be totally fatal to the entire disc drive could cause the gimbal to fracture.

It should also be noted that in the flexure of the present invention, the only gimbal forming required is a single bend in the load point tab 50. Prior art flexures universally require forming a load point protrusion, sometimes referred to as a "dimple" in the gimbal bonding surface, which invariably effected the flatness of the gimbal bonding surface. In addition, prior art flexures have some type of offset forming to allow the gimbal bonding surface to be out-of-plane from the rest of the flexure by an amount equal to the dimple height. This out-of-plane forming introduces stresses and distortions into the gimbal structure, and in some instances, cracking of the gimbal can occur. Such problems are totally absent in the flexure of the present invention.

An additional benefit of the gimbal of the flexure of the present invention is a substantial reduction in the distance between the center of gravity of the slider body and the point of contact of the load point protrusion. When rapid accelerations occur in the head positioning actuator of the disc drive, some undesirable changes in flying attitude occur. The inertia of components such as the slider can create external moments on the air bearing during such events. A general rule-of-thumb is that the magnitude of these moments is directly proportional to the distance between the center of gravity of the slider and the point of contact of the load point protrusion. In prior art flexures, it has not been possible to have the load point contact the slider and still have the contact point coplanar with the gimbal beams, as it should be for minimal gimbal stiffness in the desired axes. Prior art flexures used a dimple formed on the opposite side of the bonding surface from the slider to provide a contact point for the load beam, which meant that the load point was displaced from the slider by at least the height of the dimple. In the flexure of the present invention, the load point button 52 directly contacts the slider 48.

Referring now back to FIG. 2, the rigid beam 34 portion of the flexure of the present invention is symmetrical about the longitudinal axis 31 of the flexure and generally trapezopidal in shape with the small base of the trapezoid adjacent the gimbal/slider mounting area 32. The general function of the rigid beam 34 is to transfer the downward force generated by the pair of compliant beams 36 to the gimbal/slider mounting area 32. As such, it is important that the rigid beam 34 be extremely stiff to resist both bending along the longitudinal axis 31 and twisting about the longitudinal axis 31.

Figure 5:
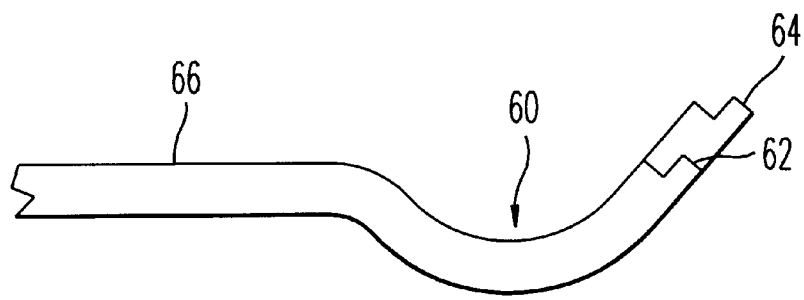
FIG. 5 is a partial sectional view showing the forming of the edge of the rigid beam portion of the flexure of the present invention.

In order to impart high stiffness to the rigid beam 34, the material of the rigid beam 34 is formed to substantially increase the sectional moment of inertia. Along the tapered edges of the rigid beam 34 are V-shaped channels 60, with the apex of the V extending in the direction of the slider. FIG. 5 is a partial sectional view of one of these channels 60 taken along the general line 5—5 in FIG. 2. The channels 60 are typically formed 0.0045 inches out-of-plane. The distal edge of the V channel may be approximately level with the plane of the unformed material as shown at 62. In some cases it may be advantageous to have the distal edge of the V channel extend beyond the plane of the unformed material, since the bending moment increases in the direction away from the gimbal, and therefore a higher sectional moment of inertia is desirable. In such a case, the distal end of the channel could be formed at the point shown by the designator 64. In either case, the precise location of the distal end of the channel 60 is determined by the artwork mask used to etch the outer edge of the flexure.

A further, albeit slight, increase in sectional moment of inertia can be realized if the distal edge of the V channel 60 is not etched at a right angle to the material surface, as is typical in prior art flexures. By using two differing artwork patterns during etching, it is possible to etch a "beveled" edge. Ideally, the angle of this bevel should be such that the etched edge, after forming, will be substantially parallel to the plane of the unformed material. This approach is shown in FIG. 5 at the distal edge of the channel 60. In the figure it can be seen that the very edge of the material of the flexure is half-etched to form a "step" which, after the forming of the channel 60, lies substantially parallel to the surface 66 of the unformed material. This stepped edge provides the maximum "edge length", and thus contributes to the stiffness of the rigid beam 34.

While the preferred cross-sectional shape of the channel is a V, it should be readily apparent that other shapes could be employed to achieve a high sectional moment of inertia.

Additional stiffening of the reinforced beam can be obtained by drawing the center section of the rigid beam 34 out-of-plane. In the plan view of FIG. 2, this stiffening area 68 is somewhat teardrop shaped, and oriented in the same direction as the tapering of the rigid beam 34, but other shapes for the stiffening area can be readily conceived. The stiffening area 68 is drawn out-of-plane approximately the same amount as are the channels 60.

Figure 6:
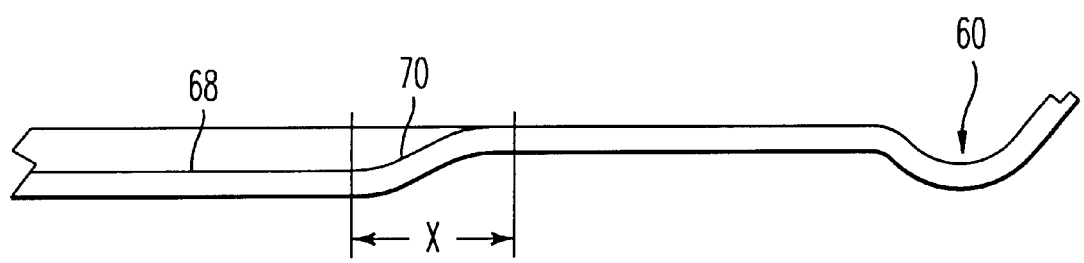
FIG. 6 is a partial sectional view showing the forming of the rigid beam to increase stiffness.

The rigidity of the rigid beam 34 is optimized when the area of the drawn material in the stiffening area 68 is substantially equal to the area of the unformed material. As shown in FIG. 6 which is again a partial sectional view along line 5—5 of FIG. 2, between the drawn and undrawn material is a transition region 70 which is strained when the material is formed. In order to prevent cracking in the transition region 70, it has been found that the strain level should be kept to a maximum of 5 percent of material tensile strength. The minimum length, x, for a transition region 70 which meets this requirement can be found by using the following formula:

$$x = \sqrt{\frac{d^2}{1.05^2 - 1}}$$

where:
x is the length of the transitional region, and
d is the distance out-of-plane that the material is drawn.

The channels 60 on the edges of the rigid beam 34 also serve as a routing path for the wires (not shown) which carry the read/write signals to and from the head mounted in the slider. As can be seen in FIG. 2, the ends 72 of the channels 60 nearest the gimbal/slider mounting area 32 are formed at an acute angle to the line 74 where forming of the channels 60 begins. This angle is to facilitate the routing of the head wires into the channels 60.

Figure 7:
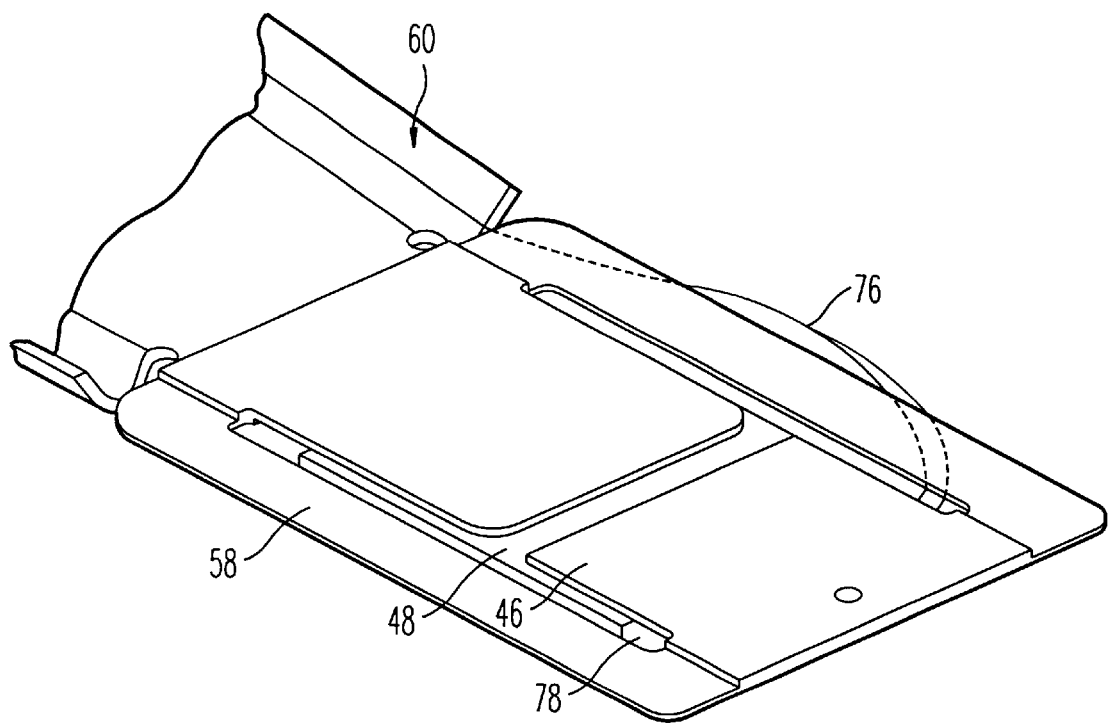
FIG. 7 is a partial perspective view of the flexure of the present invention as assembled to a slider assembly.

FIG. 7 is a detail perspective view of the gimbal end of the flexure of the present invention with a slider attached. As can be seen, the wires 76 that carry the read/write signals to and from the transducer (not shown) are attached to the slider 48 on its trailing surface 78 and are routed in a loop to the channel 60 along the side of the flexure. Since the flexure is symmetrical about its longitudinal axis, this allows upward-facing and downward-facing flexures to carry the wires 76 on the same side relative to the actuator, thus easing connection to the pcc (28 in FIG. 1) which carries these signals to and from the disc.

Referring again to FIG. 2, attached to the large base of the trapezoid shaped rigid beam 34 are a pair of compliant beams 36. One function of these beams 36 is to serve as a low friction pivot, or hinge. Another function is to provide the downforce that counteracts the hydrodynamic lift of the air bearing surfaces of the slider. In the preferred embodiment, the two compliant beams 36 are each 0.100 inches long and 0.040 inches wide. The distance between the outer edges of the two compliant beams 36 is 0.200 inches at the root of the beams, with this distance decreasing in the direction of the gimbal/slider mounting area 32 at a rate substantially equal to the tapering of the rigid beam 34. The distance from the root of the two compliant beams 36 to the load point button (52 in FIG. 3) is 0.610 inches.

The two compliant beams 36 are formed after the flexure is etched such that the slider will be encouraged toward the disc when the entire head/gimbal assembly is installed in the disc drive. The preferred method of forming the two compliant beams 36 is described in detail in U.S. Pat. No. 5,065,268, issued Nov. 12, 1991, assigned to the assignee of the present invention and incorporated herein by reference.

A comparison between a typical prior art flexure/slider assembly and a flexure/slider assembly made in accordance with the present invention shows clearly that the inventive flexure can contribute significantly to the reduction of separation between the flexure/slider mounting surface and the disc surface, thus allowing closer disc spacing which can lead to either lower overall drive height or additional discs within a given package dimension. In prior art flexure/slider assemblies, the minimum flexure mounting surface to disc surface dimension is the arithmetic sum of the following thicknesses:

Slider thickness: 0.017±0.001

Gimbal dimple height: 0.0055±0.0005

| Load beam thickness: | 0.0025 + 0.00025 |
|---|---|
| Total: | 0.0250 + 0.00175 worst case, + 0.001146 three sigma. |

Using the flexure of the present invention, the same minimum dimension is the sum of the following thicknesses:

| Slider thickness: | 0.017 + 0.001 |
|---|---|
| Flexure thickness: | 0.0025 + 0.00025 |
| Total: | 0.0195 + 0.00125 worst case, + 0.001031 three sigma. |

From these figures, it is apparent that, not only does the flexure of the present invention allow approximately a 22% reduction in this dimension, but that worst case tolerance error we has also been significantly reduced.

It is also apparent that the flexure of the present invention is less expensive to manufacture since the need for gimbal-to-load beam welding has been eliminated. Laser welders are expensive pieces of capital equipment in their own right, with low throughput, and require expensive and precise fixturing to align the separate pieces for the welding process. Moreover, as previously stated, the welds produced by laser welding contain high residual stresses that can distor the flexure, reducing quality levels.

In summary, the inventive flexure can contribute to a reduction in disc-to-disc spacing—with either reduced drive height or increased drive capacity—while lowering costs and improving the precision of the disc drive.

While a specific embodiment of the present invention has been discussed, numerous variations—for instance in materials, proportion of elements, and methods of manufacture—are possible. For example, the flexure of the present invention could be realized from beryllium copper or titanium, the flexure could be made proportionally wider to improve in-plane bending resonant frequency, or the flexure could be manufactured by stamping with reactive etching to reduce the thickness of material in desired areas.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for forming a flexure for a rigid disc drive data storage device, said flexure comprising a load beam and a load point tab, and the load point tab comprising a load point, comprising the steps of:

(I) coating a first side of a material with a resist to form a first side resist coating on the first side;

(II) coating a second side of said material with a resist to form a second side resist coating on the second side;

(III) exposing said first side resist coating to a first pattern of light;

(IV) exposing said second side resist coating to a second pattern of light, wherein said second pattern is not identical to said first pattern;

(V) stripping resist from said first side and said second side of said material to define:

(1) on said first side, a first exposed metal surface not covered by resist defining a load beam pattern corresponding to a portion of said first pattern;

(2) on said second side, a second exposed metal surface not covered by resist having said load beam pattern and positioned such that said first exposed metal surface opposes said second exposed metal surface;

(3) on said first side, a third exposed metal surface not covered by photo resist and having dimensions corresponding to said load point tab in first and second perpendicular directions;

(4) on said first side, a fourth non-exposed metal surface covered by photo resist, surrounded by said third exposed metal surface, and having dimensions in said first and second perpendicular directions corresponding to dimensions of said load point in said first and second perpendicular directions; and (5) wherein said third exposed metal surface and said fourth non-exposed metal surface are opposed on said second side by photo resist covered surface of said material; and (VI) concurrently exposing said first side and said second side to an etchant for a duration sufficient:

(1) to etch away all material between said first metal surface region and said second metal surface region, to thereby define at least lateral edges of said load beam;

(2) to not etch away all material between said third exposed metal surface and the opposing portion of said second surface, to thereby define said load point tab; and (3) to not etch away all material between said fourth non-exposed metal surface and opposing the portion of said second surface, to thereby define said load point.

2. The method of claim 1 wherein said fourth non-exposed metal surface is round.

3. The method of claim 1 wherein said fourth non-exposed metal surface is oval.

4. The method of claim 1 wherein said fourth non-exposed metal surface is oblong.

5. The method of claim 1 wherein said fourth non-exposed metal surface has no dimension in the first or second direction larger than about 0.002 inches.

6. The method of claim 1 wherein a load point is defined by said step of etching, and further comprising spanking said load point to radius an edge of said load point.

7. The method of claim 1 wherein a load point is defined by said step of etching, and said step of etching also defines a half tone transition between a top of said load point and a depth of half etching forming said load point tab.

8. The method of claim 1 wherein said step of stripping defines a half tone pattern.

9. The method of claim 8 wherein said half tone pattern comprises at least one small circle.

10. The method of claim 9 wherein said half tone pattern comprises multiple small circles.

11. The method of claim 10 wherein said circles are spaced from one another depending upon their distance from a center of said load point.

12. The method of claim 8 wherein said half tone pattern comprises at least one ring.

13. The method of claim 8 wherein said half tone pattern comprises a plurality of rings.

14. The method of claim 13 wherein line widths of each ring depend upon that ring's distance from a center of said load point.

15. The method of claim 13 wherein line spacings between rings depend upon distance from a center of said load point button.

16. The method of claim 1 further comprising forming a gimbal.

17. The method of claim 1 wherein a load point is defined by said step of etching, and said load point tab is offset from a centerline of said load beam.

18. The method of claim 1 wherein a load point is defined by said step of etching, and further comprising mounting a slider to said flexure such that said load point contacts said slider at a point offset toward a trailing edge of said slider.

19. A method of claim 1 further comprising the step of assembling the flexure into a disk drive.

* * * * *